May 14, 1935.   J. H. ABRAMSON   2,001,087
IMPACT TESTING MACHINE AND METHOD
Filed Feb. 9, 1931   3 Sheets-Sheet 1
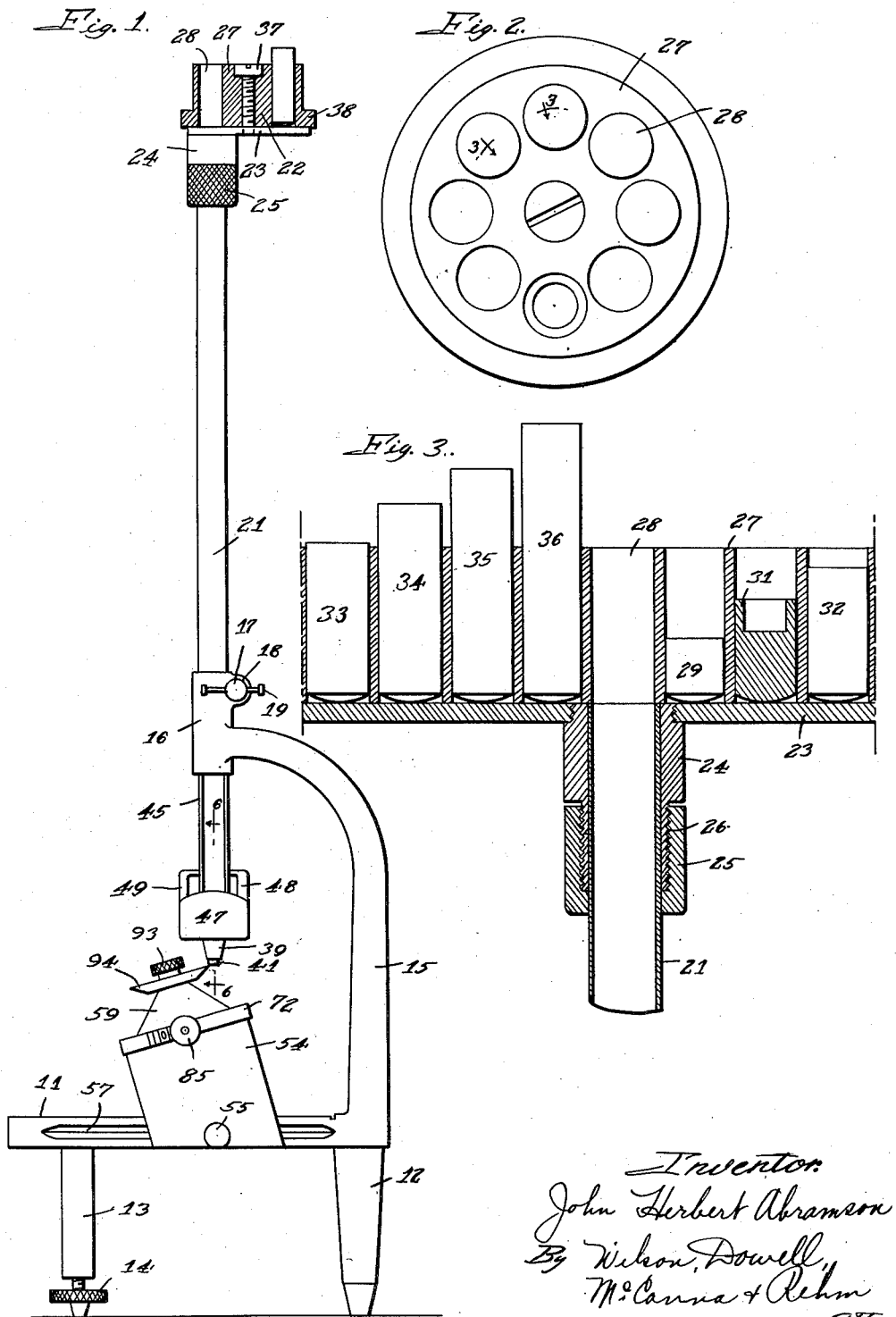

May 14, 1935.  J. H. ABRAMSON  2,001,087
IMPACT TESTING MACHINE AND METHOD
Filed Feb. 9, 1931  3 Sheets-Sheet 2

Inventor:
John Herbert Abramson
By Wilson, Dowell,
McCanna & Rehm
Attys.

May 14, 1935. J. H. ABRAMSON 2,001,087
IMPACT TESTING MACHINE AND METHOD
Filed Feb. 9, 1931 3 Sheets-Sheet 3
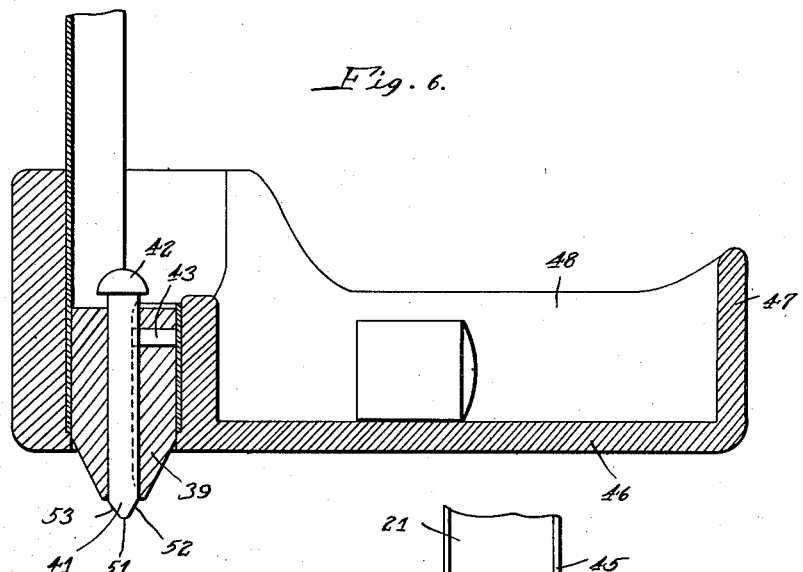
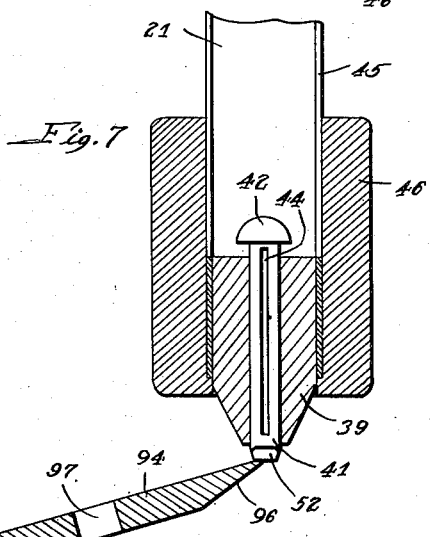
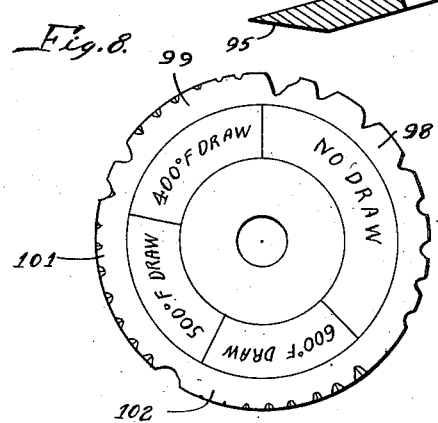

Patented May 14, 1935

2,001,087

UNITED STATES PATENT OFFICE 2,001,087

IMPACT TESTING MACHINE AND METHOD

John Herbert Abramson, Rockford, Ill., assignor to Greenlee Bros. & Co., Rockford, Ill., a corporation of Illinois Application February 9, 1931, Serial No. 514,371

16 Claims. (Cl. 265—13)

This invention relates to a method and apparatus for testing the degree of toughness and brittleness of materials and is directed more particularly to a method and apparatus for testing steel.

Numerous methods and apparatus are known and have been used for the testing of steel. However, none of these, so far as I am aware, serve to indicate to the operator the toughness or correlative brittleness of the test piece, by which I mean the tendency of the metal to distort or to break under a sudden impact. Many of the known methods serve to indicate hardness. These usually require considerable skill on the part of the operator and do not give the results contemplated in the present application.

I have aimed to provide an improved method for testing steel whereby the relative toughness and brittleness may be determined.

I have further aimed to provide a method wherein the tests may be carried out upon a specimen selected at random from material under manufacture.

Another object of the invention is the provision of a testing method wherein a permanent record of the result of the tests is obtained.

Another object of the invention is the provision of a testing method wherein a plurality of tests may be performed on a single specimen, the specimen being subject to various treatments between successive tests to produce a visual record of the effect of such treatments.

Another object of the invention is the provision of testing apparatus adapted to be employed in testing metal for toughness and fragility.

Another object of the invention is the provision of a testing apparatus wherein a series of tests may be recorded upon a single test piece.

Another object of the invention is the provision of a testing apparatus wherein a blade is driven against the edge of a test piece with impacts of varying strength whereby the breaking characteristics of the material may be determined by inspection.

Other objects and attendant advantages will become apparent to those skilled in the art from the following description and the accompanying drawings, in which—

Figure 1 is a vertical perspective of the apparatus shown partly in section;

Fig. 2 is a top view of the hammer holder and the hammers;

Fig. 3 is a development on the line 3—3 of Fig. 2 showing the supporting and guiding tube in section;

Fig. 6 is a vertical section on the line 6—6 of Fig. 1;

Fig. 7 is a central vertical section through the blade support and test piece at right angles to Fig. 6, and Fig. 8 is a top view of a test piece showing the manner in which the tests are permanently recorded.

Figure 4:
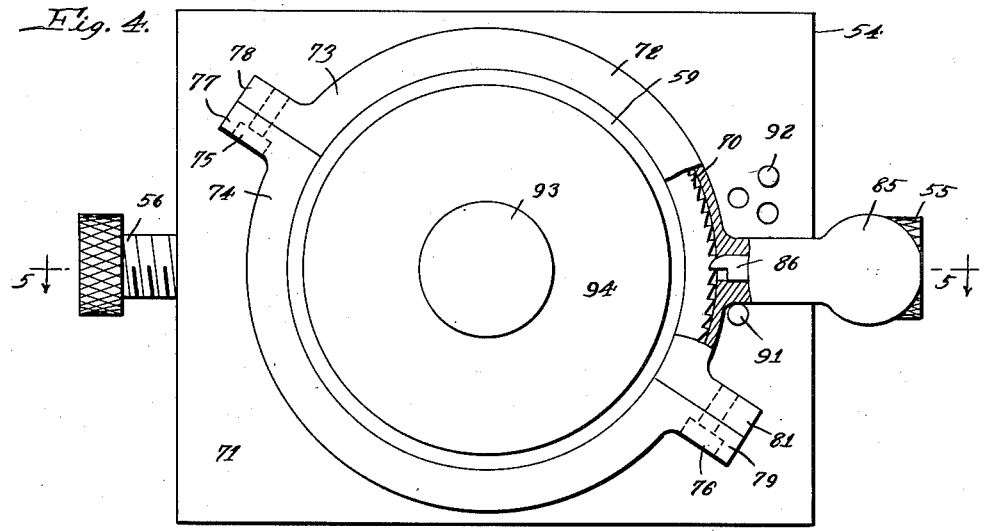
Fig. 4 is a top view of the specimen and specimen support.

The invention contemplates in a general way the provision of a method and apparatus for testing materials, particularly steel and like materials, wherein the material under test is subjected to a series of progressively varying impacts from a tool or blade of uniform shape characteristics. The material under test should preferably be formed in a manner to show the results of such blows in a decided manner.

For purposes of this description I will describe the process and the apparatus simultaneously and show the manner in which this particular apparatus performs the various steps of the process and brings about the desired results. It will be clear, however, that this is by no means the only apparatus capable of performing the steps of the process since numerous other machines operating on widely differing principles may be employed. I will further describe the apparatus as used in the testing of steel although it may be employed in a like manner in testing numerous other materials such as metal alloys, plastics and the like.

The process of refinement or treatment of steels in preparation for the various services to which it may be put is generally referred to as hardening or tempering, sometimes called drawing. It is a known fact that steel when hardened can be subjected by a subsequent treatment at lower temperatures than that used in the initial hardening and may thereby be affected in a manner that will alter the characteristics of the metal. If the secondary heating is increased to a certain point it will result in what is known in the art as an anneal or softening. One use of my process and apparatus is to reveal the condition of the metal after each of several successive tempers, each temper being at a progressively higher temperature than that preceding and to produce a specimen having a record of the characteristic of the metal between each of the tempers.

Referring to the drawings—the apparatus consists of a frame having a base plate 11, a leg 12 and a pair of legs 13 one having a screw 14 positioned at the lower end thereof to permit the platform 11 to be adjusted to a level position. An upright 15 is positioned at the rear side of the base plate 11 and is provided at its upper end with a split sleeve 16. A tightening bolt 17 passes through a pair of ears 18 on opposite sides of the slot in the sleeve and is provided with a pin 19 to permit the sleeve to be tightened about a guiding tube 21. The tube 21 may be of any suitable length, in this particular instance about 26½ inches. The bolt 17 permits the vertical adjustment of the tube 21 in the sleeve 15.

A hammer holder, designated generally by 22, is positioned at the upper end of the tube 21. This consists of a plate 23 eccentrically positioned with respect to the tube 21 having a flange 24 surrounding the upper end of the tube and drawn tightly thereabout by means of a nut 25 threadedly engaging the lower end of the flange 24, as shown at 26. The plate 23 has an opening coincidental with the bore of the tube 21. A block 27 is provided with a plurality of cylindrical openings 28 adapted to hold cylindrical hammers 29, 31, 32, 33, 34, 35 and 36. These hammers rest within the openings 28, with their lower ends against the upper face of the plate 23. The block 27 is rotatably supported upon the plate 23 by means of a screw 37 having thread engagement with the plate 23. Thus, the block 27 may be rotated about the pin 37 to bring any one of the cylindrical openings 28 into registration with the opening of the tube 21, the openings 28 being of substantially the same diameter as the internal diameter of the tube whereby the hammer held in the particular opening brought into registration is permitted to drop downward through the tube against a striking blade presently to be described. A knurled rim 38 permits the block 27 to be conveniently manually manipulated.

A blade support 39 of wood, but which may be of metal, rubber, or other more or less resilient material is positioned in the lower end of the tube 21 and is provided with a central opening to receive a striking blade 41. The striking blade is provided with an enlarged head 42 adapted to prevent the blade from sliding out of the blade support 39 and to receive the impact of the hammers 29 and 36 as they reach the end of their movement in the tube 21. A key 43 is positioned in the blade support 39 and engages a keyway 44 in the blade 41 to prevent the blade from rotating or sliding from the blade support. A portion of the side wall of the tube 21 is cut away above the blade support 39, as shown at 45, to permit the hammers to fall out or be removed from the tube 21 after they have struck the striking blade. Normally, the hammers will be thrown out of the tube 21 through this slot when they impinge against the striking blade. A receptacle, designated generally by the numeral 46, and having side walls 47, 48 and 49 is positioned on the lower end of the tube 21, the side walls forming a pan to receive the hammers as they are thrown out of tube 21, as shown in Fig. 6. The lower end of the striking blade 48 is in this instance provided with a narrow arcuate face 51 and sloping side walls 52 and 53, the end 51 serving as the working face of the blade. The face 51 is arcuate and has a curvature corresponding to the arc of a one-eighth inch circle, in the particular embodiment herein disclosed, though this may be varied widely. However, blades of various other useful shaped characteristics may be employed.

Figure 5:
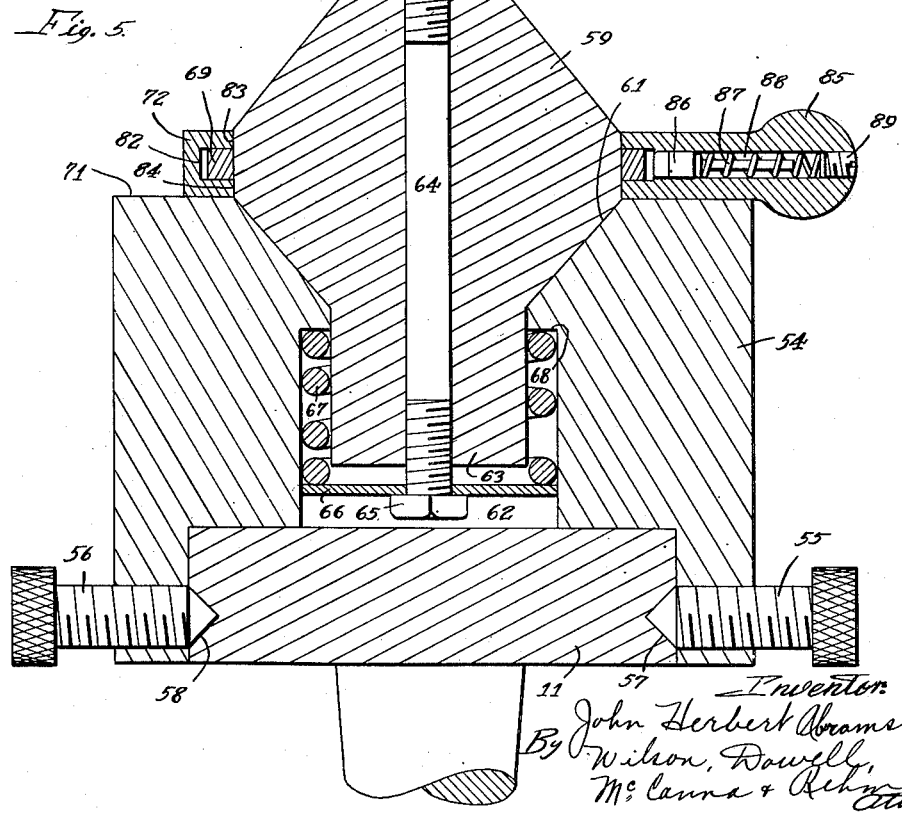
Fig. 5 is a vertical section on the line 5—5 of Fig. 4.

Referring now to Figs. 1, 4 and 5—a holder frame, designated generally by the number 54, is positioned on the base plate 11 and is slidably secured thereto by means of a pair of knurled stud bolts 55 and 56 which pass through the sides of the frame 54 and engage grooves 57 and 58 on the sides of the base plate 11. This arrangement permits the handle frame 54 to be moved horizontally to permit specimens of different diameters to be employed, as will presently be set forth. A conical specimen holder 59 having a bearing surface 61 is adapted to seat in the holder frame to permit rotation of the holder. An opening 62 is provided within the holder frame 54 to receive the cylindrical lower end 63 of the holder. The bolt 64 passes axially through the holder 59 and is threaded at its lower end to receive a nut 65. A disc 66 of slightly smaller diameter than the opening 62 is axially positioned on the lower end of the bolt 64 and is supported thereon by the nut 65. A spring 67 surrounds the lower end 63 of the holder and exerts a pressure between a shoulder 68 at the upper end of the opening 62 and the disc 66 to maintain the holder within the frame 54. A circumferential rack 69 having teeth 70 on the periphery thereof is secured to the holder 59 in spaced relation with the upper face 71 of the holder frame 54. A rack cover 72, which may advantageously consist of two sections 73 and 74 is secured together by means of pins 75 and 76 passing through shoulders 77 and 78, 79 and 81. The rack cover is provided with a groove 82 adapted to receive the rack 69 and has a bearing on the holder 59 on each side of the rack 69 as shown at 83 and 84. A handle 85 is secured to the rack cover 72 and is provided with a pawl 86 adapted to engage the teeth 70 on the rack 69. A spring 87 within a central opening 88 in the handle 85 extends between the pawl 86 and a screw 89 to maintain the pawl constantly in contact with the rack 69. Thus, by movement of the holder 85 up and down facing Fig. 4 the holder 59 may be intermittently rotated a predetermined amount at each stroke of the handle. A pin 91 in the upper face of the holder support 54 acts as a stop for the handle 85 in its movement downward facing Fig. 4, and a plurality of pins 92 serve as stops for the handle 85 in its upward movement facing Fig. 4, one or the other of the pins 92 being employed depending upon the amount of movement desired to be imparted to the holder 59 at each movement of the handle 85. Retrograde or backward movement of the holder 59 is prevented by the friction at the bearing surface 61 between the frame 54 and the holder 59, the spring 67 and associated parts causing the holder to be pressed against the frame with sufficient force to prevent the holder from moving upon backward movement of the handle 85. The upper end of the bolt 64 is provided with a knurled nut 93 adapted to secure a circular test specimen 94, presently to be more fully described, to the upper side of the holder 59. The holder support 54 and holder 59 are secured to the base plate 11 at an angle with respect to the horizontal whereby the specimen 94 is held at an angle, in this instance about 15° with respect to the horizontal. The holder support 54 and holder 59 are adapted to hold the test specimen 94 in contact with the working face 51 of the striking blade 41, as shown in Fig. 1. The horizontal adjustability of the holder support 54 and the vertical adjustability of the tube 21 permit the working face of the striking blade to be brought into suitable relation with the edge of the test specimen 94 regardless of the diameter of the specimen.

The test specimen is formed, by suitable cutting operations, directly from the stock to be tested. It is cut into the form of a circular disc, as shown in Fig. 8, of suitable diameter for use in the apparatus. One side of the specimen is then beveled down, as shown in Fig. 7, to provide an annular beveled marginal portion 95 and 96 in this particular instance at an angle of about 21° with respect to the face of the disc. An opening 97 is formed axially in the disc to receive the bolt 64 of the apparatus in positioning the specimen upon the holder 59.

In using the apparatus to carry out my improved method the hammers are positioned in the hammer holder, a test piece is prepared in the manner indicated and secured in the apparatus. The hammer holder is then rotated to a point where the lightest hammer will fall through the tube 21 against the striking blade. The specimen is then rotated through a required angle by means of the handle 85 and the hammer holder is again rotated to release the next larger hammer. The arcuate face 51 is such as to permit the striking blade to ride up out of the nicks formed in the test specimen upon rotation of the specimen, the sloping side walls 52 and 53 facilitating this action. This process is continued until all eight of the hammers shown have been dropped against the specimen at spaced points. This will leave a visual effect upon the edge of the specimen. In some instances this will be only a distortion of the metal or in other instances a piece may actually be broken out. The specimen is then removed from the holder and subjected to a desired heat treatment whereupon it is again placed within the holder and subjected to a second series of impacts from the hammers. The process may be repeated a number of times in order to determine the effect of various treatments upon the specimen.

The appearance of the test specimen after such a series of tests is indicated by way of example in Fig. 8. This example shows in the area 98 the effect of the test on a specimen of steel as received without heat treatment. The area 99 shows the effect of the impacts after the specimen had been tempered to 400° F., the area 101 shows the effect of the impacts upon the specimen after being tempered to 500° F. and the area 102 shows the effect of the impacts upon the specimen after being tempered to 600° F. Thus in the area 98 each impact broke a portion of the metal from the specimen. When tempered to 500° F. only the greatest impact broke the metal away while the lesser impacts only distorted the metal, thus clearly indicating that the brittleness of the metal had been decreased by the treatment and the toughness had been increased.

It should be observed that the specimen is mounted at an angle of less than 90° with respect to the axis of the blade and that the specimen is beveled on the lower side. This permits the effects of the impacts and of their varying intensity to be easily recorded on the specimen. Obviously, as the weight of the hammers increase they will cause greater distortions or breaks in the specimen. However, the method is not limited to the use of a particular type of specimen as a series of similar impacts may be produced directly upon a finished article, such for example as gear teeth. Cutting edges of various kinds may be tested in the same manner, as for example the cutting edge of chisels, razor blades, and the like. Furthermore, the shape of the test piece is not limited to the circular form described, as a rectangular bar can be employed and be moved longitudinally to record the successive impacts.

The size of the machine might vary materially and the size of the hammers and plungers might be varied within wide limits depending upon the particular material being tested, the peculiarities of the test piece being used, and the particular conditions under which the test is to be carried out.

A novel feature of my device is the preparation of the specimen which may be circular, as indicated in Fig. 8, or straight, as for example in the nature of a woodworker's chisel. The disc type offers advantages for general use as it conforms to the bar shape of bulk steel which is usually round. For this reason the disc type is more convenient and it permits a greater number of tests to be made upon a single test piece than is the case with a rectangular test piece.

It should further be observed that impacts of various strength can be delivered upon the test specimen by using a hammer of standard weight and varying the length of the fall. In like manner hydraulic or other means may be employed for delivering measured impacts against the specimen.

While I have thus described and illustrated a specific embodiment of my invention I am aware that numerous alterations and changes may be employed without materially departing from the spirit of the invention, and I do not wish to be limited except as required by the prior art and the scope of the appended claims, in which—

I claim:

1. A testing apparatus for performing a testing operation on a test piece having a beveled edge comprising a striking blade adapted to be placed against the edge of the test piece at an angle with respect to a surface adjoining said edge, a plurality of graduated weights, and means for successively dropping said weights to force said blade against said test piece with progressively varying impacts.

2. A testing apparatus for performing a testing operation on a test piece having a beveled edge comprising a striking blade adapted to be placed against the edge of the test piece at an angle with respect to a surface adjoining said edge, a plurality of graduated weights, means operable for successively dropping said weights to force said blade against said test piece with progressively varying impacts, and means for guiding said weights while they drop.

3. A testing apparatus adapted to test a circular test piece having a peripheral edge comprising a striking blade adapted to be placed at an angle with respect to a surface adjoining said edge and against said edge, means for releasably holding said test piece, means for slidably holding said blade, means for supporting a plurality of hammers of progressively varying weights, means for releasing successive weights to fall against said blade, means for guiding the movement of said weights, and means for indexing said test piece for bringing said blade in contact with the edge of said test piece at spaced intervals to receive the impression of successive hammers.

4. A testing apparatus as set forth in claim 3 having means for receiving said weights after they have dropped against said blade.

5. A testing apparatus as set forth in claim 3 having means for adjusting the horizontal position of said test piece.

6. A testing apparatus as set forth in claim 3 having means for adjusting the horizontal position of said test piece, and means for adjusting the vertical position of said blade whereby to accommodate test pieces of different diameters.

7. A testing apparatus comprising a plurality of graduated striking hammers, a guiding tube adapted to guide the vertical movement of said hammers, a hammer holder secured to the upper end of said tube having a plurality of openings for slidably holding said hammers, means for rotating said holder to bring successive openings into registration with said tube and permit said hammers to drop therethrough, a striking blade slidably positioned in the lower end of said tube and having a lower end projecting therefrom, and means for supporting a test piece having an edge with said edge against said blade.

8. A testing apparatus comprising a striking blade adapted to be placed against the peripheral edge of a circular test piece and at an angle with respect to a surface adjoining said edge, means operable for forcing the blade against the test piece with a series of measured impacts, and means whereby said test piece may be rotated a predetermined amount between each impact to space said impacts along said edge.

9. A testing method comprising preparing a test piece having a uniformly shaped thin edge of increasingly greater thickness from the terminus toward the center, striking said edge a series of blows of progressively varying strength at spaced points, the range of strength of said blows being such that some are effective to distort said test piece and others to break the same, and comparing the effect of said blows upon the test piece to determine the breaking characteristics thereof.

10. A steel testing method comprising preparing a test piece having a uniformly shaped thin edge, striking said edge at a uniform angle a series of blows of progressively varying strength with a blade of uniform shape characteristics at spaced points, treating said test piece in a manner dependent upon the effect of said blows, and again striking said test piece in like manner to produce a test piece record of the effect of said treatment to guide the operator in the use of said steel.

11. A steel testing method comprising preparing a test piece having a uniformly shaped edge, striking said edge at a uniform angle a series of blows of progressively varying strength with a blade of uniformly shaped characteristics at spaced points, tempering said test piece at a series of temperatures dependent upon the effect of said blows, and delivering a series of blows thereon in like manner after each tempering, to produce a test piece record of the effect of said treatment, to guide the operator in the use of said steel.

12. A testing method comprising preparing a test piece having a uniformly shaped comparatively thin edge, the test piece being of progressively increasing thickness from said edge toward the center, striking said edge at a uniform angle at least one series of blows of progressively varying strength with a blade of uniform shape, the thickness of said edge and the strength of said blows being suited to the material under test, to cause some of said blows to merely distort the edge while others fracture the same, and noting the effect of said blows, to determine the breaking characteristics of the material.

13. A steel testing method comprising preparing a test piece having a uniformly shaped comparatively thin edge, striking said edge at a uniform angle a series of blows of progressively varying strength at spaced points with a blade of uniform shape characteristics, treating said test piece in a manner dependent upon the effect of said blows, and again striking said test piece in like manner, the strength of said blows and the thickness of said edge being so adjusted that some of said blows merely distort the edge while others fracture the same, to produce a test piece record of the effect of said treatment to guide the operator in the use of said steel.

14. A testing instrument for performing a testing operation upon a test piece having a beveled edge, comprising a striking blade having a wedge-like point, means for positioning the blade with the point thereof crosswise of said edge and with the operating face at an angle less than 90° with respect to a surface adjacent to said edge, and means for imparting measured and graduated striking impulses to said blade of intensities sufficient to impart a test record of said impulses to the edge of said test piece.

15. Testing apparatus for performing a testing operation on a test piece having a free edge, comprising a striking blade positioned at the edge of said test piece, means for supporting the test piece and the blade so that the transverse axis of the test piece and the longitudinal axis of the blade cross at an angle less than 90°, said means for supporting the test piece including means whereby the test piece can be moved with respect to the blade to present different portions of said edge to the blade, and means for causing the blade to deliver a series of measured impacts of progressively changing amounts to the edge of the test piece to impart thereto a permanent test record.

16. Testing apparatus for performing a testing operation on a test piece having a free edge comprising a striking blade positioned at the edge of said test piece, means for supporting the test piece and the blade so that the transverse axis of the test piece and the longitudinal axis of the blade cross at an angle less than 90°, a plurality of graduated weights, and means for successively dropping said weights freely under the influence of gravity to force said blade against the test piece with progressively varying impacts.

JOHN HERBERT ABRAMSON.